Aug. 7, 1923.
G. R. STEUART
1,464,373
PROCESS FOR THE REGENERATION OF ANHYDROUS ALUMINUM CHLORIDE
Filed Nov. 26, 1921
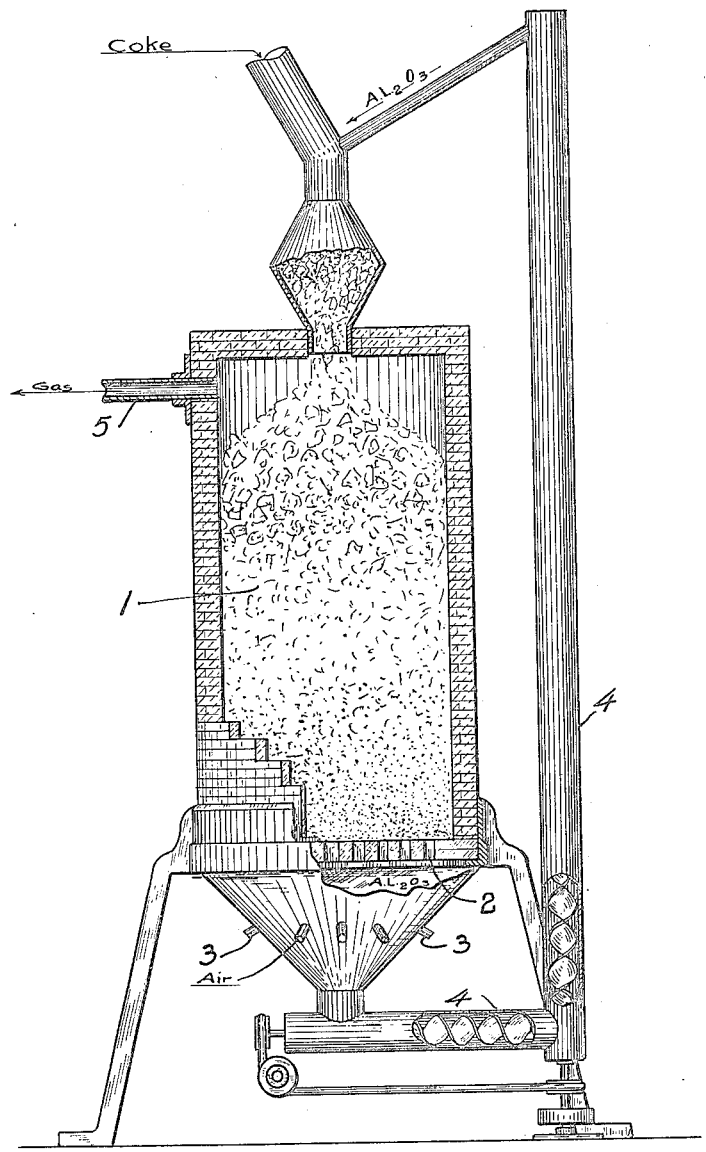
Inventor
Gordon R. Steuart.
By A. J. O'Brien
Attorney Patented Aug. 7, 1923.

1,464,373

UNITED STATES PATENT OFFICE.

GORDON R. STEUART, OF DENVER, COLORADO, ASSIGNOR OF ONE-THIRD TO A. H. HIRSIG AND ONE-THIRD TO WILLIAM C. HOLLISTER, BOTH OF DENVER, COLORADO.

PROCESS FOR THE REGENERATION OF ANHYDROUS ALUMINUM CHLORIDE.

Application filed November 26, 1921. Serial No. 517,966.

*To all whom it may concern:*

Be it known that I, GORDON R. STEUART, a subject of the Kingdom of Great Britain, residing at the city and county of Denver and State of Colorado, have invented certain new and useful Improvements in Processes for the Regeneration of Anhydrous Aluminum Chloride; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a method for the regeneration of anhydrous aluminum chloride, after it has been used as a catalyzer in the treatment of petroleum and similar mineral oils.

In the treatment of oils it is often found to be desirable to convert high boiling oils into lower boiling oils, and in performing this conversion anhydrous aluminum chloride has been found to be among the most effective of the catalyzing agents that can be employed.

As the manner in which the anhydrous aluminum chloride is employed in the treatment of oil is well known, I shall not attempt to describe the same, but will limit the description to the method by which the anhydrous aluminum chloride is recovered and made available for further use, after it has been employed in the above referred to treatment.

As is well known in this art, the anhydrous aluminum chloride is added to the oil to be treated in an amount up to ten per cent by weight of the original charge of oil operated on, and the process of distillation carried on until the contents of the still constitutes an approximately dry residue which resembles coke and which contains enmeshed therein the original amount of anhydrous aluminum chloride, or at least the elements aluminum and chlorine in the proper proportions to form aluminum chloride.

In spite of the fact that aluminum chloride volatizes at a low temperature (about 180° C), it is found to be impossible to recover more than a very small proportion by heating the coke, even to a very high temperature.

If care is taken to stop the distillation before the residue has become too dry, it is possible to separate the aluminum chloride in its entirety by washing with water at ordinary atmospheric temperature, but this method of recovering the aluminum chloride is subject to several objections, among which is that it is recovered in the hydrated form which is of no value in the treatment of oil, and before it can be so employed it must be converted to the anhydrous form by a process which is both complicated and costly.

It is the object of this invention to provide a method by which I can recover the aluminum chloride directly in the anhydrous form, and I will now proceed to describe my process in detail.

In order to enable me to more clearly describe my process, I shall have reference to the accompanying drawing, which shows diagrammatically an apparatus by which my process can be carried out.

After the treatment of the oil, the aluminum chloride is contained in a coky mass of carbon, substantially free from hydrocarbons, and I shall hereinafter refer to this as aluminum chloride coke.

The aluminum chloride coke is fed into a suitable retort 1, either continuously or intermittently, which has a grate 2 and suitable air inlets 3 through which air is supplied for the combustion that is to take place. As the desired subsequent reactions all take place in the retort, but in different zones thereof, it is essential that the available space occupied by the coke shall be sufficient, and the retort is therefore made of considerable size. After the coke has been placed in the retort, it is ignited at the bottom and air admitted through pipes 3 in sufficient quantities to sustain the combustion. After combustion of the carbon has proceeded for a time, the heat evolved therefrom will bring all or a part of the coke in the retort to a high temperature. During the combustion of the coke and the passage of the gases formed therefrom through the incandescent coke column, the desired reactions—which will now be described—will take place.

On first entering the retort the oxygen of the air immediately reacts with the carbon to form carbon dioxide with the liberation of a large amount of heat. This heat, due to the passage of the gas through the retort, serves to bring the mass of coke therein to a high temperature. At the same time, such aluminum chloride as was enmeshed in the carbon thus oxidized, is liberated. Due, however, to the high temperature existing and to the excess of oxygen present, all or some of the aluminum chloride is oxidized to alumina ($Al_2O_3$) and chlorine is liberated.

Up to this point and while still in the first or lowest zone of the retort, we have then converted the aluminum chloride coke to carbon dioxide, chlorine and aluminum oxide. The aluminum oxide is non-combustible and non-volatile and collects at the bottom of the retort. The amount of the aluminum oxide thus produced is and must be proportional to the amount of chlorine liberated.

This liberated aluminum now in the form of an oxide is then extracted from the retort, either at intervals or continuously, either by hand or mechanically, as by screw conveyors, and added to the coke as it is fed to the opposite end of the retort. In view of this step, it will be seen that the coke present in the retort will consist, in reality, of a mixture of the original aluminum chloride coke, together with that amount of aluminum oxide produced during the oxidation of this carbon attended by the liberation of chlorine, or, in other words, that there is and must be at all times sufficient aluminum oxide present in the retort to combine with all of the chlorine liberated to form aluminum chloride.

For reasons that will be clear from a description of the subsequent reactions to be described, it may be advisable to add an excess of aluminum oxide, which will be distributed evenly throughout the coke column and which will become a floating or circulating load. This step is not essential to the success of the process, but under certain conditions may be useful in promoting a lessened loss in chlorine.

Reverting now to the gaseous products of combustion, namely: carbon dioxide and chlorine. These gases, subsequent to their formation and on movement through the retort, come in contact with incandescent carbon. The carbon dioxide under these conditions is reduced to carbon monoxide and leaves the retort through pipe 5. Meanwhile, the chlorine has combined in part with any alumina it may have come in contact with to form aluminum chloride, thus:

$$Al_2O_3 + 6Cl + 3C = Al_2Cl_6 + 3CO$$

The chlorine which does not so combine reacts with the newly formed carbon monoxide to form carbonyl chloride $COCl_2$ thus:

$$CO + 2Cl = COCl_2$$

On coming in contact with further aluminum oxide (which, as shown in a previous paragraph, is abundantly available) and carbon (in the coke), the carbonyl chloride reacts as follows to form anhydrous aluminum chloride:

$$3COCl_2 + Al_2O_3 = Al_2Cl_6 + 3CO_2$$

The conditions existing in this zone of the retort in which the above reactions occur for the formation of aluminum chloride, are such that there is no uncombined oxygen present, due to the amount of incandescent carbon present through which the various gases have passed. The oxygen has all been converted to carbon monoxide, and under these conditions such aluminum chloride as may be present is perfectly stable and thus continues its passage through the remainder of the retort unaltered, together with the carbon monoxide. These products on issuing from the retort are hot, and the aluminum chloride is in the vapor state. On cooling sufficiently the aluminum chloride condenses to a solid and may then be separated from the carbon monoxide. The carbon monoxide may then be burnt for the production of heat or power or both.

Since the aluminum chloride has been regenerated for the purpose of reuse with further oil, the preferred method of condensing same is by means of the oil itself, thus avoiding considerable labor and possible loss in handling.

It must be clearly understood from the above description of my process that I do not limit myself to any particular form of retort in which it may be carried out. Also I do not limit myself to any special method of condensing the aluminum chloride vapor. I have invented a particular operation which, through a series of clearly described chemical reactions, results in the end desired, and it is clear that these operations may be carried out in several different forms of apparatus without in any way altering the novelty and value of the principles involved.

Having now described my invention, what I claim is:

1. The method for the separation of anhydrous aluminum chloride from petroleum coke, which consists of oxidizing the carbon to the gaseous state, thereby liberating the occluded aluminum chloride, converting the latter to aluminum oxide and chlorine, subjecting the aluminum oxide and chlorine to further heat in a reducing atmosphere, whereby the aluminum oxide and chlorine combine to form anhydrous aluminum chloride.

2. The process of separating occluded anhydrous aluminum chloride from petroleum coke which consists of burning the coke in a closed retort, whereby the occluded aluminum chloride is liberated in the form of chlorine and aluminum oxide, adding aluminum oxide to the upper part of the coke, passing the gaseous products of combustion, including the chlorine, upwardly from the oxiding zone to the reducing zone of the coke where the chlorine will combine with the aluminum oxide to form gaseous anhydrous aluminum chloride and removing and cooling the same, whereby the anhydrous aluminum chloride is condensed.

3. The method of recovering anhydrous aluminum chloride from petroleum coke, which consists of burning the coke in a retort, passing the products of combustion upwardly through strata of progressively smaller oxidizing properties to which aluminum oxide has been added into strata having reducing properties, removing the gases from the retort and subjecting them to a temperature sufficiently low to cause the anhydrous aluminum chloride to condense.

4. The method of recovering anhydrous aluminum chloride from petroleum coke, which consists of placing a comparatively deep bed of coke in a retort, igniting the lower side of said coke bed, whereby the aluminum chloride is converted into aluminum oxide ($Al_2O_3$) and chlorine, passing said chlorine upwardly into and through the reducing zones of said coke to which aluminum oxide has been added, whereby the aluminum oxide is reduced to aluminum and combines with the chlorine to form gaseous aluminum chloride, removing the gases from the retort and subjecting the same to a temperature sufficiently low to cause the aluminum chloride to condense.

5. The method for the regeneration of anhydrous aluminum chloride from the residue remaining after the treatment of mineral oils therewith, which consists of oxidizing the carbon to the gaseous state, thereby liberating the occluded aluminum chloride, oxidizing the aluminum to aluminum oxide ($Al_2O_3$) and liberating the chlorine, mixing the aluminum oxide with coke, passing the gaseous products through the heated mixture of coke and aluminum oxide, whereby the aluminum and chlorine will reunite to form anhydrous aluminum chloride, removing the carbon monoxide and anhydrous aluminum chloride from the retort and subjecting them to a temperature of such value that the anhydrous aluminum chloride will condense and become separated from the carbon monoxide.

6. The recovery or regeneration of anhydrous aluminum chloride from the residue remaining after the treatment of mineral oils therewith by oxidizing the carbon to the gaseous state, resulting in the liberation of the occluded aluminum chloride with the attendant oxidation of the latter to aluminum oxide and chlorine, and the subsequent reunion of the aluminum oxide and chlorine to form anhydrous aluminum chloride under the influence of heat and carbon, and the further conversion of the carbon contained in the original residue from distillation into carbon monoxide as a valuable by-product.

In testimony whereof I affix my signature.

GORDON R. STEUART.